US005932096A

United States Patent [19]

Saho et al.

[11] Patent Number: 5,932,096

[45] Date of Patent: Aug. 3, 1999

[54] MAGNETIC PURIFYING APPARATUS FOR PURIFYING A FLUID

[75] Inventors: Norihide Saho; Hisashi Isogami; Minoru Morita; Fumitaka Handa; Katsuhiko Asano, all of Ibaraki-ken, Japan

[73] Assignee: Hitachi, Ltd., Japan

[21] Appl. No.: 08/933,090

[22] Filed: Sep. 18, 1997

[30] Foreign Application Priority Data

| | | | |
|---|---|---|---|
| Sep. 18, 1996 | [JP] | Japan | 8-246311 |
| Oct. 17, 1996 | [JP] | Japan | 8-274294 |

[51] Int. Cl.[6] .............................. B01D 35/06; B03C 1/00

[52] U.S. Cl. .......................... 210/208; 210/205; 210/222; 210/409; 209/223.1; 505/892

[58] Field of Search .................................... 210/222, 223, 210/685, 409, 198.1, 205, 208; 209/223.1; 505/892, 931

[56] References Cited

U.S. PATENT DOCUMENTS

| | | | |
|---|---|---|---|
| 4,054,513 | 10/1977 | Windle | 210/222 |
| 4,769,130 | 9/1988 | Christensen | 210/222 |

FOREIGN PATENT DOCUMENTS

| | | |
|---|---|---|
| 59371 | 1/1984 | Japan . |
| 61-118112 | 6/1986 | Japan . |

OTHER PUBLICATIONS

Magnetic Separation and Application, Chemical Technical Magazine MOL vol. 22, No. 12, pp. 47–51 (1984).

*Primary Examiner*—David A. Reifsnyder
*Attorney, Agent, or Firm*—Evenson, McKeown, Edwards & Lenahan, P.L.L.C.

[57] ABSTRACT

An improved apparatus for removing magnetic material from a flowing fluid such as water by magnetic separation has a single set of electromagnets which are used with a plurality of magnetic filters for continuous magnetic separation operation alternately without obstructing the flow of the fluid being processed. A high-gradient magnetic filter arrangement which passes through a magnetic field generated by the magnets is made up of at least two magnetic filters separated by a watertight partition. When the fluid being processed is flowing through one of the magnetic filters, the other filter is removed from the flow of the fluid into a magnetic filter housing which is separated from the fluid flow through the magnetic filter by means of partitions. Backwashing of this other magnetic filter is carried out while purification of the fluid being processed by the former magnetic filter continues uninterrupted. Dummy magnetic filters are provided at the outer ends of the magnetic filter arrangement so that whichever of the magnetic filters is removed from the flow of the fluid being processed, the filter matrices do not leave the magnetic field formed by the plurality of magnets, and consequently the magnetic filters can be moved in and out of the magnetic field with a minimal driving force.

13 Claims, 9 Drawing Sheets

MAGNETIC PURIFYING APPARATUS FOR PURIFYING A FLUID

BACKGROUND OF THE INVENTION

This invention relates to a purifying apparatus for removing magnetic material from a fluid, and particularly to a purifying apparatus structure with which it is possible to separate and remove magnetic material from a fluid continuously.

Magnetic separation is a known technology for removing matter from a fluid, and for continuously purifying sea, river or reservoir water or the like. Japanese Unexamined Patent Publication No. S.59-371, for example, discloses a magnetic separator apparatus in which this kind of solid-liquid separation technology is applied, using a high-gradient magnetic filter. As a pretreatment preceding a magnetic separation step, a magnetic powder (such as for example tri-iron tetroxide) and a coagulant (such as aluminum sulfate or aluminum polychloride) are added to the source water to be processed after it is taken in, and the source water is then stirred. When this is done, solid suspended matter and algae, fungi and microorganisms in the source water are bonded with a magnetic floc by the coagulant, forming numerous magnetic coagulations in the form of a colloid, or magnetic material. This magnetic material is then passed through a magnetic separator, to which it is attracted and is thus separated from the source water.

The basic construction of a purifying apparatus using magnetic separation is shown in FIG. 8. It is made up of a conduit 2 having a filter 3 disposed therein, and one end open below the surface of a water reservoir 1. The intake side of a pump 4 is connected to the other end of the conduit 2, and a source water storage tank 5 is connected to the delivery side of the pump 4. A stirring tank 9 connected to the source water storage tank 5 by a pipe 8, has a stirrer 11 driven by a motor 10 mounted thereon. A chemical regulating apparatus 7 is connected to the pipe 8 by a pipe 8A. Magnetic separator apparatus 100 is connected to the stirring tank 9 by the conduit 14 which has a valve 13 disposed therein, while a processed water tank 23 is connected to the magnetic separator apparatus 100 by a conduit 22 via a valve 21. A conduit 24 connects the processed water tank 23 and the reservoir 1.

The apparatus shown in the figure purifies source water from the reservoir 1, and returns it to the reservoir 1 after processing. (The reference numerals in FIG. 8 are the same as in FIG. 1 and FIG. 2.) Source water from the reservoir 1 is pumped by the pump 4 through the conduit 2 and the filter 3 (which removes large pieces of matter), and is temporarily stored in the source water storage tank 5. Magnetic particles of tri-iron tetroxide and a coagulant such as polyaluminum chloride from the chemical regulating apparatus 7 are then added to the source water through the pipe 8A, and it is fed into the stirring tank the stirring tank 9 is stirred by the stirrer 11 rotated by the motor 10. The pretreated water 12, which contains a floc of magnetic material, then passes through the conduit 14 and the valve 13 and flows into a magnetic separator vessel 15.

Electric power is supplied from a d.c. power supply 17 to an air-core coil 16. A magnetic field proportional to the magnitude of the d.c. current is formed inside the cylindrical magnetic separator vessel 15 (which is disposed with its axis vertical), and is evened by porous magnetic poles 18, which are circular plates provided with holes for water to pass through. The air-core coil 16 is surrounded by an iron yoke 19, which serves as a path for magnetic force lines, to prevent leakage thereof.

Magnetic fine wire packing of a magnetic filter matrix (hereinafter called the matrix) of a high-gradient magnetic filter 20 is magnetized by the above-mentioned evened magnetic field. The magnetic field inside the magnetic separator vessel 15 is disturbed by the magnetized magnetic fine wire packing, so that concentrations of magnetic flux occur locally, creating many parts having high magnetic field gradients. Thus, when the pretreated water 12 containing the magnetic floc is fed upward, the magnetic floc is caught on the surface of the magnetic fine wire of the packing by a large magnetic force. Purified source water therefore passes as processed water through the valve 21 and the conduit 22 and is temporarily stored in the processed water tank 23 before being returned to the reservoir 1 through the conduit 24.

When a predetermined amount of magnetic floc has been caught on the high-gradient magnetic filter 20, it must be backwashed to restore its magnetic separation performance. First the valve 13 is closed, so that feeding of the pretreated water 12 is stopped, and the d.c. power supply is cut, eliminating the magnetic field. A predetermined amount of processed water is then passed back from above the high-gradient magnetic filter 20 through the valve 21 and a valve 25 is opened. At the same time, air is supplied from an air tank 26 through a valve 27 and a pipe 28 and air-bubbling is carried out. In this manner, magnetic floc adhering to the surface of the magnetic fine wire is washed off, and the washing water is stored in the backwash water tank 29. This washing water is separately taken from the backwash water tank 29 and is finally disposed of, either by discarding it in a landfill or by drying and burning it.

After backwashing, the valves 25 and 27 are closed, a d.c. current from the d.c. power supply 17 is once again supplied to the air-core coil 16, the valve 27 is opened, and magnetic separation is resumed.

One disadvantage of this type of purifying arrangement is that during washing of the high-gradient magnetic filter 20 it is necessary to stop purification operation, which decreases the amount of water that the apparatus can purify and reduces the purification operation efficiency.

Japanese Unexamined Patent Publication No. S.59-371 discloses a method which permits continuous purification by providing two magnetic separation parts which are operated and backwashed alternately. However, this arrangement requires electromagnets in each of the magnetic separation parts, so that the manufacturing cost and installation space are greater.

Japanese Unexamined Patent Publication No. S.61-118112 discloses another arrangement which permits purification to be carried out continuously. A magnetic filter matrix disposed in the magnetic field is divided into a plurality of stages in the fluid flow direction and each stage is movable in a direction perpendicular to the fluid flow direction so that their directions of movement are opposite. A magnetic filter matrix is moved to outside the magnetic field, washed and then moved back into the magnetic field. However, in this publication, there is no mention of the relationship between the magnetic flux direction inside the magnetic field and the fluid flow direction, of the details of the structure of the magnetic filters (magnetic filter matrixes) moved in and out of the magnetic field, or of a method for preventing leakage of washing water into the magnetic field. Also, with this apparatus, because the ends of the magnetic filters move as far as the boundary between the inside and the outside of the magnetic field, there is the problem that a large magnetic force acts on the filter in one direction;

consequently a large driving force is required to move the filter. Furthermore there is the problem that some washing water containing magnetic floc detached by backwashing flows back through the filter into the magnetic field space and leaks to the magnetic field side and into the purified water.

SUMMARY OF THE INVENTION

It is therefore an object of the present invention to provide a magnetic fluid purifying apparatus which eliminates leakage of washing water and can carry out magnetic separation continuously.

Another object of the invention is to provide such a magnetic fluid purifying apparatus in which the force necessary to withdraw the magnetic filters for backwashing is minimized or substantially reduced.

These and other objects and advantages are achieved according to the invention by providing a separate housing chamber (which is also separate from the atmosphere) in which the magnetic filter matrix is washed, together with means (such as a watertight partition) for separating the above-mentioned housing chamber from a section through which the fluid which is being processed flows, and in which magnetic separation is carried out. In addition, it is also advantageous to make the magnetic filter matrix sufficiently long (in its movement direction) so that when it moves, its ends never cross the boundary between the inside and the outside of the magnetic field.

In one embodiment of the invention, electromagnets of the magnetic separator are made up of a plurality of electromagnets divided in the direction of the required magnetic flux. openings formed in the walls of the magnetic separator and facing in a direction perpendicular to that of the magnetic flux created in the magnetic separator, provide entrance and exit openings for movement of the matrix into and out of the magnetic separator. The matrix itself is divided (in the movement direction) by partitions into a plurality of matrices, and moves within a range such that the ends of the matrix do not cross the boundary between the inside and the outside of the magnetic field. In this manner, it is possible to move the matrix with a small force without greatly obstructing the flow of the water in the direction of the magnetic flux in the magnetic separator. It is also possible to carry out the magnetic separation operation with a matrix which is inserted into the magnetic separator while at the same time backwashing a matrix which has been removed to a position outside the magnetic separator to be reinserted into the magnetic separator after backwashing. In this manner, magnetic material detached from the matrix can be easily caught, without the water used for backwashing being allowed to leak into the magnetic separation part. As a result, the efficiency of the purification operation increases, and because a plurality of matrices can be used for magnetic separation with one set of electromagnets, the magnetic separator apparatus can be made compact.

Also, if high-temperature superconductivity type superconducting electromagnets such as niobium-titanium, niobium-tin, niobium-aluminum, bismuth or thallium superconducting electromagnets are used for the above-mentioned electromagnets, extremely little power is needed to form the magnetic field. Moreover, because it unnecessary in a continuous separation system to operate the electromagnet power supply during operation, permanent current operation is possible during separation operation. Thus, the current supply cables can be mechanically separated from the supercool magnets, so that it is possible to prevent a flow of heat from room temperature parts to the superconducting magnets, thereby reducing the consumption of coolant (such as liquid helium or liquid nitrogen). Also, when the superconducting magnets are cooled by refrigeration units, the power consumption of the latter can be reduced, so that they can be made smaller.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
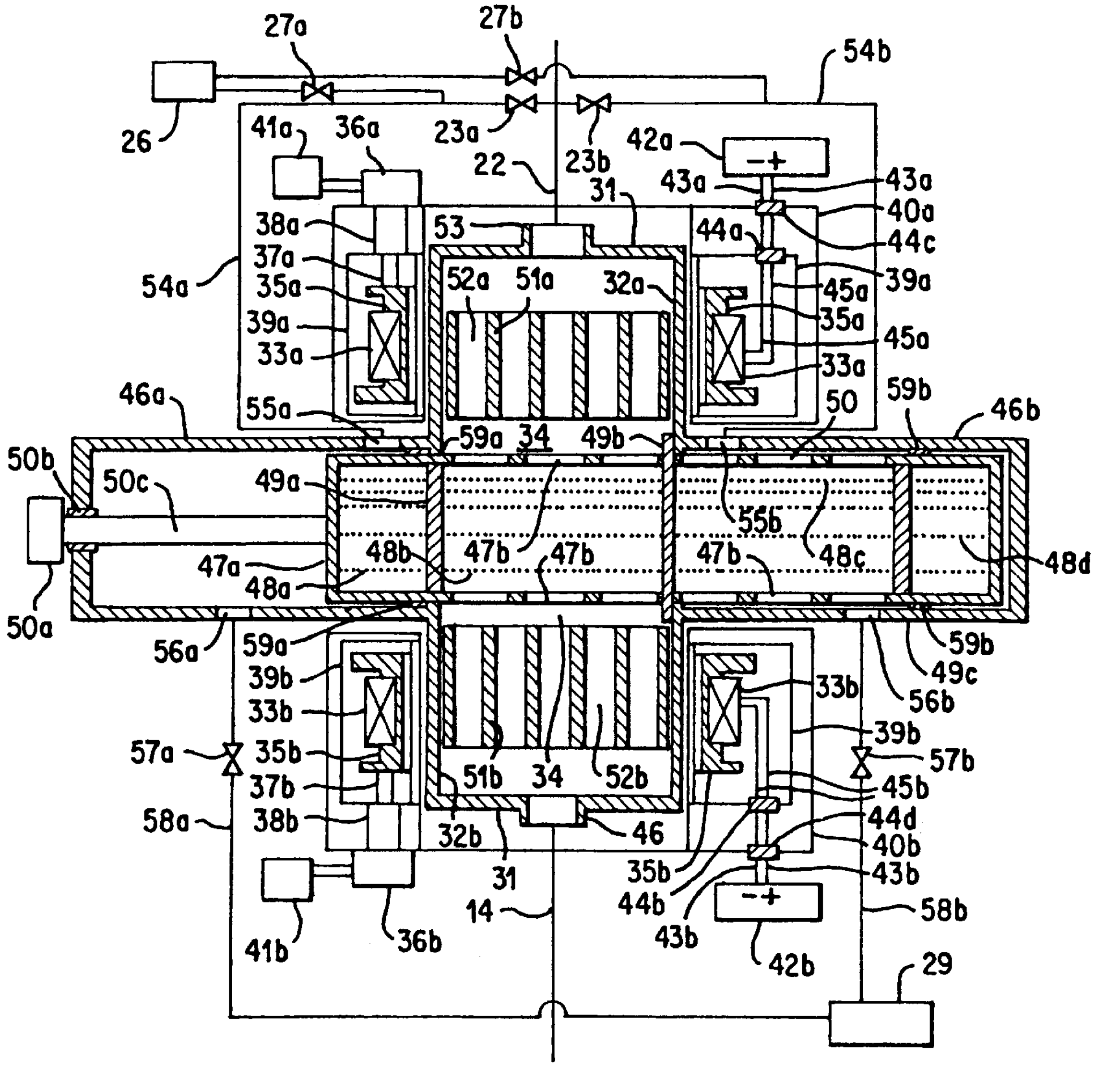
FIG. 1 is a partly sectional view of a first preferred embodiment of the invention.
Figure 2:
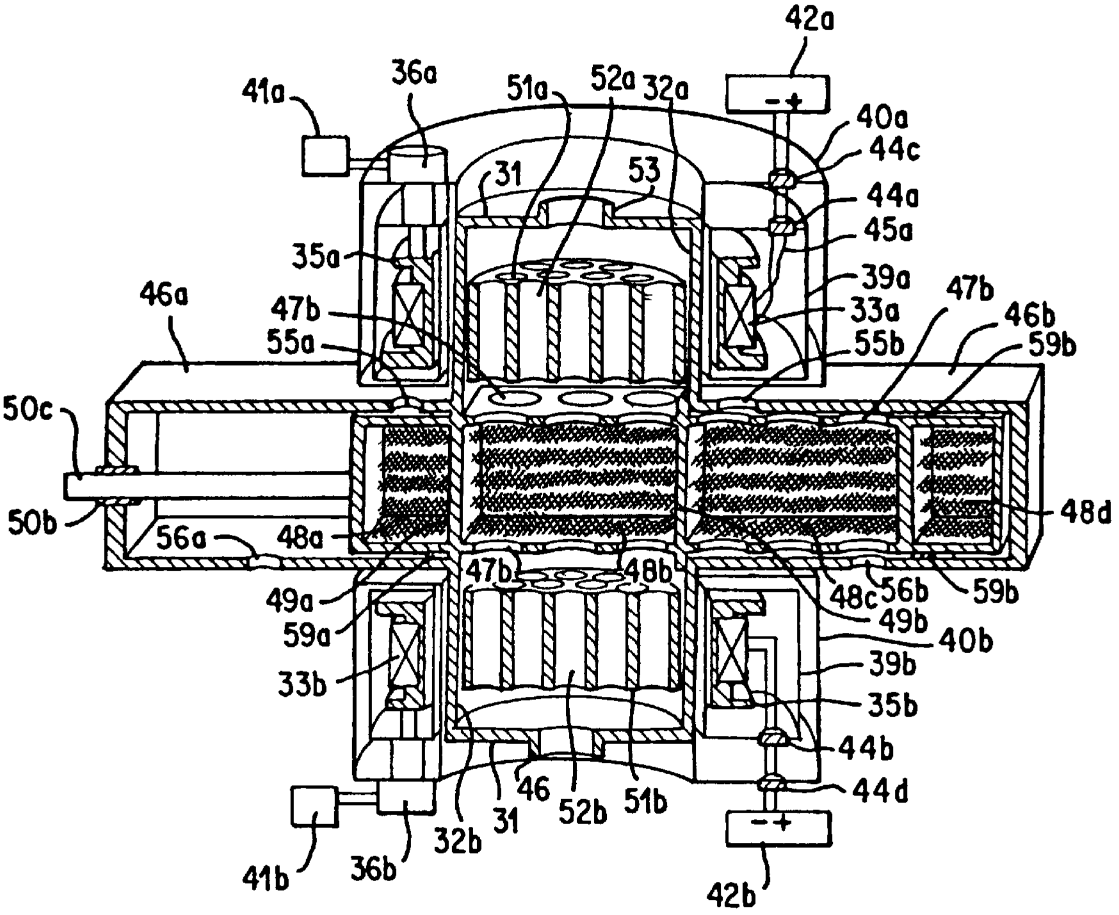
FIG. 2 is a sectional perspective view of a magnetic separator embodiment shown in FIG. 1.
Figure 3:
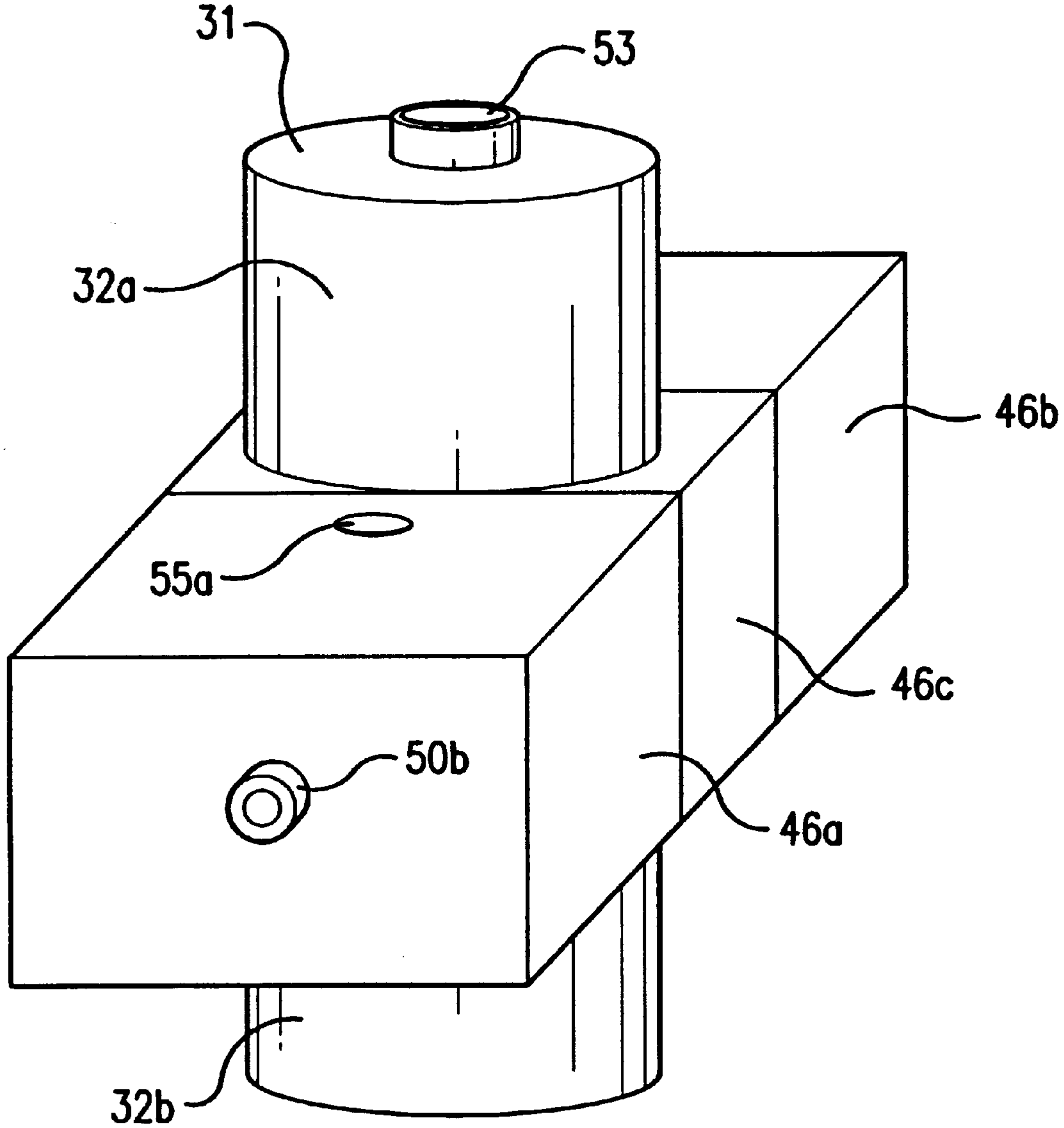
FIG. 3 is perspective view of a magnetic separation vessel of the preferred embodiment shown in FIG. 1.
Figure 8:
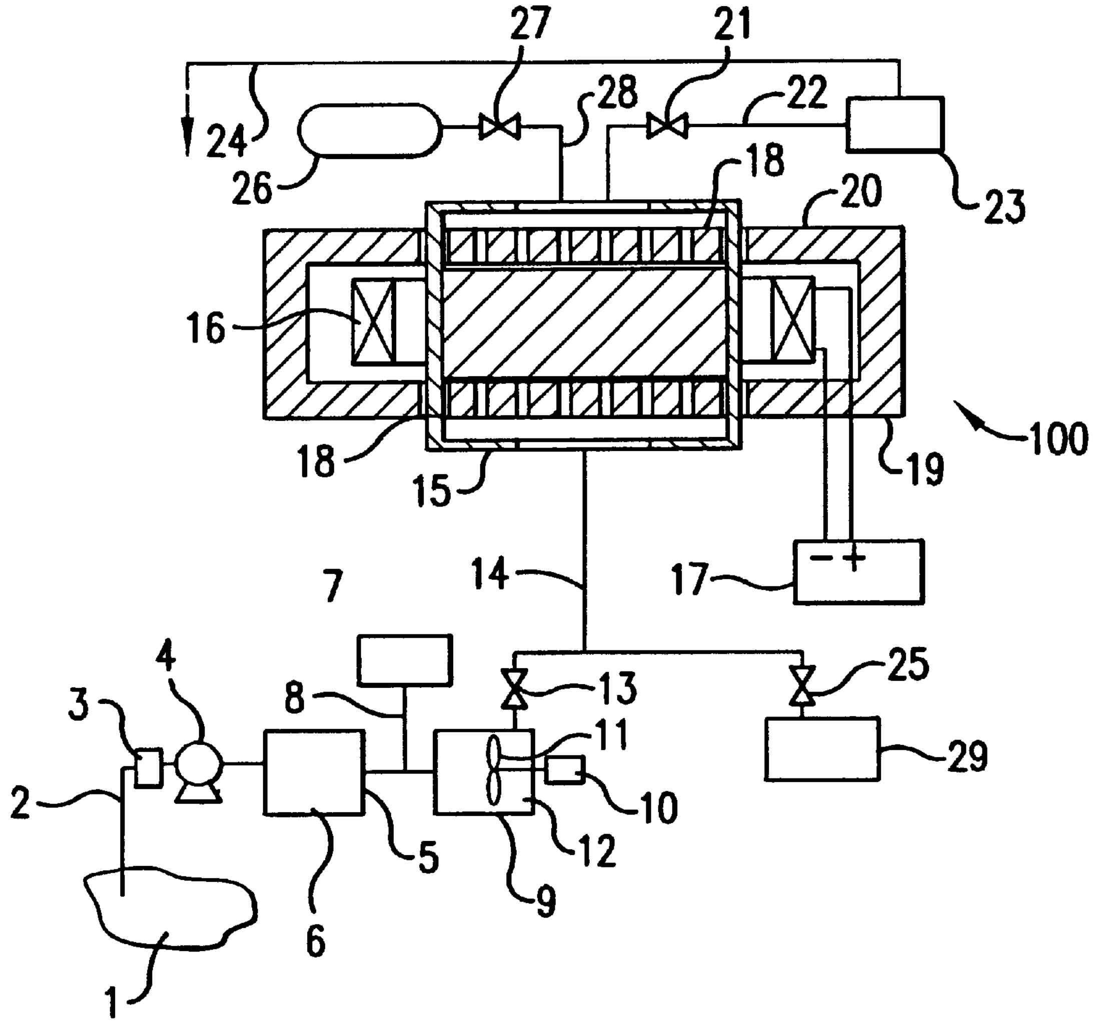
FIG.8 PRIOR ART
FIG. 8 is a partly sectional view of a magnetic separator apparatus of the prior art.

A first preferred embodiment of the invention will now be described with reference to FIGS. 1 through 3. FIG. 1 shows the overall construction of the apparatus including a cross-sectional view of a main part of the apparatus, while FIG. 2 is a sectional perspective view of the main part of the apparatus, and FIG. 3 is an external perspective view of the main part of the apparatus (a magnetic separator vessel). Elements corresponding to the part outside the dotted line in FIG. 8 are not described in the following because it is of the same construction as that shown in FIG. 8. Accordingly, the part described here corresponds to the magnetic separator apparatus 100 of FIG. 8.

The purifying apparatus (more specifically, a magnetic separator of a purifying apparatus) shown in these figures is constructed with the following as main parts: a cylindrical vessel 32*a* containing a magnetic pole 51*a* and oriented with its axis vertical; a cylindrical vessel 32*b* containing a magnetic pole 51*b* facing the cylindrical vessel 32*a* across a rectangular and hollow magnetic filter housing 46*c*; rectangular and hollow magnetic filter housings 46*a*, 46*b* facing each other on either side of the magnetic filter housing 46*c* in a horizontal direction, perpendicular to the axis of the cylindrical vessels 32*a*, 32*b*; a magnetic filter holding vessel 47*a* housed in the magnetic filter housings 46*a*, 46*b*, 46*c*, movably in a direction perpendicular with the above-mentioned axis; a rod 50*c* passing through an airtight slide part 50*b* in the end (the end farther from the magnetic filter housing 46*b*) of the magnetic filter housing 46*a* and connected to the magnetic filter holding vessel 47*a*; a rod driving device 50*a* disposed outside the magnetic filter holding vessel 47*a* for driving the rod 50*c*; bobbins 35*a*, 35*b* disposed concentrically around the cylindrical vessels 32a, 32b respectively; cylindrical solenoid superconducting electromagnets (hereinafter called superconducting magnets or air-core magnets) 33a, 33b wound on the bobbins 35a, 35b respectively; a plurality of rods 60 (FIG. 4) disposed vertically between the bobbins 35a, 35b so as to prevent the two from approaching each other; a doughnut-shaped heat shield vessel 39a containing the bobbin 35a and the air-core magnet 33a and a doughnut-shaped heat shield vessel 39b containing the bobbin 35b and the air-core magnet 33b; doughnut-shaped vacuum insulating vessels 40a, 40b respectively containing the heat shield vessels 39a, 39b; and refrigerating units 36a, 36b for cooling second cooling ends 37a, 37b in contact with the bobbins 35a, 35b and first cooling ends 38a, 38b in contact with the heat shield vessels 39a, 39b respectively.

The insides of the cylindrical vessels 32a, 32b and the magnetic filter housings 46a, 46b, 46c form a continuous single space, and this vessel will be called the magnetic separator vessel 31. The cylindrical vessels 32a, 32b and the magnetic filter housing 46c form a flow path for a fluid which being processed, while the magnetic filter housings 46a, 46b are receiving parts for receiving magnetic filter matrixes withdrawn from the flow path of the fluid being processed.

The magnetic filter holding vessel 47a housed in the space formed by the magnetic filter housings 46a, 46b, 46c (lined up horizontally) has its interior partitioned into four sections by a watertight partition 49b disposed in its middle and watertight partitions 49a, 49c disposed near its ends. In order from the left in FIG. 1 and FIG. 2 these sections are packed with magnetic filter matrixes (hereinafter called magnetic filters) 48a, 48b, 48c, 48d. Multiple holes 47b for water being processed, purified water and backwashing water to pass through, are provided in the walls of the magnetic filter holding vessel 47a constituting the upper and lower faces of the sections packed with the 12 magnetic filters 48b, 48c. Also, seals 59a, 59b are provided around the outside of the magnetic filter holding vessel 47a in the positions of the partitions 49a, 49c and watertightly seal the gap between the outer surface of the magnetic filter holding vessel 47a and the inner surfaces of the magnetic filter housings 46a, 46b, 46c.

In addition to the main parts described above, the separator 100 also has the following equipment: compressors 41a, 41b respectively connected to the refrigerating units 36a, 36b by high-pressure pipes 42a, 42b and low pressure pipes 43a, 43b; a power supply 67a for supplying electric current to the superconducting magnet 33a through current lead wires 68a, 45a and a power supply 67b for supplying electric current to the superconducting magnet 33b through current lead wires 68b, 45b; electrical insulators 44c, 44d interposed between the current lead wires 68a, 68b and the vacuum insulating vessels 40a, 40b where the current lead wires 68a, 68b pass through the vacuum insulating vessels 40a, 40b; electrical insulators 44a, 44b interposed between the current lead wires 68a, 68b and the heat shield vessels 39a, 39b; a conduit 22 (depicted schematically as a line) connected to an outflow opening 53 formed in the top of the cylindrical vessel 32a; conduits 54a, 54b (depicted schematically as lines) having one end connected to inlet openings 55a, 55b formed in the upper faces of the magnetic filter housings 46a, 46b respectively and having their other ends connected to the conduit 22; valves 23a, 23b disposed in the conduits 54a, 54b; an air tank 26 connected to the conduit 54a between the valve 23a and the inlet opening 55a by way of a valve 27a and connected to the conduit 54b between the valve 23b and the inlet opening 55b by way of a valve 27b; conduits 58a, 58b (depicted schematically as lines) having one end connected to outlets 56a, 56b respectively formed in the bottom faces of the magnetic filter housings 46a, 46b and having their other ends connected to a backwash water tank 29; valves 57a, 57b disposed in the conduits 58a, 58b; a conduit 14 (depicted schematically as a line) connected to an inflow opening 69 formed in the bottom of the cylindrical vessel 32b; and heat shield vessels 61, 62 (FIG. 4) disposed in the form of a double cylinder around the rods 60 and having their ends connected to the heat shield vessels 39a, 39b and the vacuum insulating vessels 40a, 40b respectively.

The various parts will now be described in more detail.

In FIG. 1, the solenoid superconducting electromagnets 33a, 33b disposed around the upper and lower cylindrical vessels 32a, 32b of the magnetic separator vessel 31 create a vertically oriented magnetic field in the space 34 inside the magnetic separator vessel 31 between the superconducting electromagnets 33a, 33b. The directions of the magnetic fluxes created by the solenoid superconducting electromagnets 33a, 33b are the same, and the strength of the magnetic field is determined by the current which flows in the electromagnets, and by the number of windings of the coils. This preferred embodiment shows an example wherein superconducting magnets are used for the electromagnets.

For bobbins 35a, 35b, bobbins made of an alloy comprising stainless steel, copper or aluminum may be used; also bobbins made of copper, aluminum alloy or strengthened epoxy resin (divided up in the circumferential direction) or made of a combination of these materials are suitable. The bobbins are chosen to have strong rigidity, small heat capacity and good heat conductivity, and so that an excessive current is not liable to flow through the bobbin during magnetization and demagnetization. The second cooling ends 37a, 37b of the refrigerating units 36a, 36b are brought into direct or indirect thermal contact with portions of the bobbins 35a, 35b, so that the superconducting electromagnets 33a, 33b are cooled to and held in a superconducting state by way of the bobbins 35a, 35b.

The doughnut shaped heat shield vessels 39a, 39b are cooled by means of thermal contact with the first cooling ends 38a, 38b (whose cooling temperature is higher than that of the second cooling ends 37a, 37b) of the refrigerating machines 36a, 36b, and thermally shield the superconducting electromagnets 33a, 33b by absorbing incoming radiant heat. The outsides of the heat shield vessels 39a, 39b are insulated by the vacuum insulating vessels 40a, 40b. The refrigerating units 36a, 36b are connected to the compressors 41a, 41b by the high-pressure pipes 42a, 42b and the low-pressure pipes 43a, 43b and are supplied with an operating fluid at a high pressure. The fluid is allowed to expand adiabatically inside the refrigerating units to produce cold, and the expanded working fluid is returned to the compressors.

Electric current is supplied to the superconducting electromagnets 33a, 33b from the power supplies 67a, 67b through the current lead wires 68a, 68b, 45a, 45b. The ends of the current lead wires 68a, 68b from the room temperature part are connected to portions of the respective vacuum insulating vessels 40a, 40b by way of (for example, ceramic) electrical insulators 44c, 44d, and also are thermally connected to portions of the heat shield vessels 39a, 39b by way of the electrical insulators 44a, 44b, which are good thermal conductors and are made of for example sapphire. The current lead wires 45a, 45b from the electrical insulators 44a, 44b on the superconducting electromagnet side are made of a material which becomes superconductive at a temperature higher than that of the heat shield vessels 39*a*, 39*b*, or the first cooling ends 38*a*, 38*b* and are connected to the superconducting electromagnets 33*a*, 33*b*.

For the refrigerating machines 36*a*, 36*b*, devices using helium, nitrogen, air, hydrogen or a fluorohydrocarbon gas as a working coolant, or electronic devices using Peltier elements are used. As types of cooling unit in which a gas is used as the working fluid, Gifford McMahon type, Solvay type, Sterling type, pulse tube type, Collins expander type, expansion turbine type or expansion valve type machines or machines in which these are combined, are used.

As shown in FIG. 3, the upper and lower cylindrical vessels 32*a*, 32*b* of the magnetic separator vessel 31 are so connected that they form a common space with the rectangular magnetic filter housings 46*a*, 46*b*, 46*c* between them. The magnetic filter holding vessel 47*a* (FIGS. 1, 2) disposed inside the magnetic filter housings 46*a*, 46*b*, 46*c* is connected to the rod 50*c* passing through the airtight slide part 50*b* and moved in the left-right direction in FIG. 1 and FIG. 2 by the rod driving device 50*a* and moves in this left-right direction together with the rod 50*c*. The space 34 (FIG. 1) for magnetic separation is formed inside the magnetic filter housing 46*c* of FIG. 3.

Inside the magnetic filter holding vessel 47*a*, magnetic filters 48*a*, 48*b*, 48*c*, 48*d* made of magnetic metal gauze or expanded metal or the like are disposed in multiple layers and divided by the partitions 49*a*, 49*b*, 49*c*. The middle partition 49*b* separates the magnetic filters 48*b*, 48*c*, and also forms a projection outside the magnetic filter holding vessel 47*a* which (when the filter holding vessel 47*a* is positioned to the right, as depicted in FIGS. 1 and 2) abuts with a partition wall 64 on the right side of the magnetic filter housing 46*c*, so that it separates the space inside the magnetic filter housing 46*c* from the space inside the magnetic filter housing 46*b*. Similarly, when the filter holding vessel 47*a* is moved to the left in FIGS. 1 and 2, the projection abuts with a partition wall 64 on the left side of the magnetic filter housing 46*c*, and separates the space inside the magnetic filter housing 46*c* from the space inside the magnetic filter housing 46*a*. Also, when the magnetic filter holding vessel 47*a* has moved to the right, as shown in the Figures, a left side backwashing tank space (the space inside the magnetic filter housing 46*a*) is separated from the magnetic separation space (the space inside the magnetic filter housing 46*c*) by the seal 59*a*, and when the magnetic filter holding vessel 47*a* has moved to the left (not shown) a right side backwashing tank space (the space inside the magnetic filter housing 46*b*) is separated from the magnetic separation space (the space inside the magnetic filter housing 46*c*) by the seal 59*b*.

Pressure-relieving means (not shown) are provided in the ends of the magnetic filter housings 46*a*, 46*b* so that the magnetic filter holding vessel 47*a* can move to the left and right easily. Also, the length of the magnetic filter holding vessel 47*a* (in its movement direction) is selected so that when it moves to the right side in the figures the magnetic filter 48*a* remains inside the magnetic filter housing 46*a* (as shown in FIGS. 1 and 2), and when it moves to the left side, the magnetic filter 48*d* remains inside the housing 46*b*.

A fluid which is being processed flows through holes 47*b* in the upper and lower faces of the sections of the magnetic filter holding vessel 47*a* holding the magnetic filters 48*b*, 48*c*. Columnar magnetic poles 51*a*, 51*b* provided with multiple holes 52*a*, 52*b* parallel with each other in the axial direction are disposed inside the upper and lower cylindrical vessels 32*a*, 32*b* of the magnetic separator vessel 31, so that magnetic flux created by the superconducting magnet 33*a*, in the case shown in FIG. 1, passes from the magnetic pole 51*a* through the magnetic filter 48*b* and connects with the superconducting magnet 33*b* via the magnetic pole 51*b*. With this construction, only a small portion of the magnetic flux enters the magnetic filter housings 46*a*, 46*b*.

A large magnetic gradient arises at the surface of magnetic fine wire of (for example) expanded metal constituting the magnetic filter 48*b* positioned in the magnetic field. Pretreated water containing a floc of magnetic material flows through the inflow opening 69 of the magnetic separator vessel 31 into the cylindrical vessel 32*b* of the magnetic separator vessel 31, passes through the holes 52*b* in the magnetic pole 51*b* and the holes 47*b* in the bottom of the magnetic filter holding vessel 47*a* and flows into the inside of the magnetic filter 48*b*. There, the magnetic material in the water being processed is attracted by magnetic force to the surface of the magnetic filter 48*b*, where the magnetic gradient is large, and is caught on the surface of the magnetic fine wire. Having been purified by the magnetic material thus being separated from it, the water then passes through the holes 47*b* in the top of the magnetic filter holding vessel 47*a* and the holes 52*a* in the magnetic pole 51*a*, and flows out through the outflow opening 53 of the magnetic separator into the conduit 22. The purified water is temporarily stored as processed water in a processed water tank 23 and then returned to a reservoir 1 through a conduit 24 as in FIG. 8.

When a predetermined amount of magnetic material has been caught by the magnetic filter, it must be backwashed to restore its magnetic separation capability. For this purpose, for example, when the magnetic filter 48*c* has caught a large amount of magnetic material, it is moved from the magnetic filter housing 46*c* into the magnetic filter housing 46*b* on the right side (as shown in FIGS. 1 and 2) by means of the rod driving device 50*a* and the rod 50*c*. The partition 49*b* separates the backwashing part on the right side in the figures from the magnetic separation part in the middle. The valve 23*b* is opened and water which has been purified by the magnetic filter 48*b* is allowed to pass through the conduits 22 and 54*a* and the inlet opening 55*b*, into the magnetic filter housing 46*b*. At this time, air is supplied from the air tank 26 into the conduits 54*b* through the valve 27*b*, and air-bubbling is carried out while the magnetic filter 48*c* is washed inside the magnetic filter housing 46*b*. Because it is outside the magnetic field space between the magnetic poles, the magnetic field strength inside the magnetic filter housing 46*b* is low. Therefore, the magnetic gradient at the magnetic fine wire surface is also low so that the magnetic force is small, and adhered magnetic material easily detaches from the magnetic fine wire surface.

Because a dummy magnetic filter 48*a* is provided on the left side of the magnetic filter 48*b*, (FIGS. 1 and 2) the left end of the magnetic filter 48*a* and the magnetic filter holding vessel 47*a* project beyond the magnetic field space between the magnetic poles. Therefore, the end of the magnetic filter does not cross through the magnetic field boundary where the magnetic field suddenly falls at the end of the magnetic field space. As a result, because a magnetic filter and magnetic filter holding vessel having the same magnetic susceptibility and the same mass are present at both the left and right ends of the magnetic field space, the left and right magnetic forces balance, and only a small force is necessary to move the magnetic filters to the left and right.

As described above, the magnetic material is washed from the magnetic filter, and the washing water is passed through the holes 47*b*, the outlet 56*b*, the valve 57*b* and the conduit 58*b*, and is stored in the backwash water tank 29 in the same way as in FIG. 8. This washing water is separately taken from the backwash water tank 29 and disposed of in a landfill or the like, or it is dried and the magnetic powder is recovered before the rest is burned or otherwise disposed of. During backwashing, the power supply of the superconducting magnets is not switched off, and magnetic separation is continued with the magnetic filter 48*b*, so that magnetic separation operation is carried out continuously.

When a large amount of magnetic material has been caught on the magnetic filter 48*b*, it is moved by means of the rod driving device 50*a* and the rod 50*c* into the magnetic filter housing 46*a* on the left side in the figures. Simultaneously the washed magnetic filter 48*c* moves to the left, and the flow of water being processed continues without interruption. Also, the valves 23*a*, 23*b* and 57*a*, 57*b* are closed at this time. When the movement of the magnetic filters to the left has ended, the partition 49*b* separates the backwashing part on the left side from the magnetic separation part in the middle (FIGS. 1 and 2); and the backwashing tank space on the right side is separated from the magnetic separation space in the middle by the seal 59*b*. While this operation is carried out, the water being processed continues to flow, and magnetic material therein is caught by both of the magnetic filters 48*b*, 48*c* positioned in the central magnetic field, so that processed water flows out through the outflow opening 53.

After the magnetic filter 48*b* moves to the left side, the valve 23*a* is opened so that purified water passes through the conduit 22, into the magnetic filter housing 46*a* through the conduit 54*a* and the inlet opening 55*a*. At this time, air is supplied from the air tank 26 into the conduit 54*a* through the valve 27*a*, and air-bubbling is carried out while the magnetic filter 48*b* is washed inside the magnetic filter housing 46*a*. Because the magnetic field strength inside the magnetic filter housing 46*a* is low, the magnetic gradient at the surface of the magnetic fine wire is also low, the magnetic force is small. Consequently, magnetic material detaches easily from the magnetic fine wire surface. In this way, the magnetic material is washed from the magnetic filters, and the washing water is passed through the holes 47*b*, the outlet 56*a*, the valve 57*a* and the conduit 58*a* and stored in the backwash water tank 29 in the same way as in FIG. 8. This washing water is separately taken from the backwash water tank 29 and dewatered and disposed of in a landfill or the like, or magnetic powder may be recovered from it and the rest then burned or otherwise disposed of. During backwashing, the power supply of the superconducting magnets is not switched off, and magnetic separation continues with the magnetic filter 48*c*, so that magnetic separation operation is carried out continuously.

The magnetic fine wire and filter length, etc. of the filter matrices 48*a* and 48*d* are determined so that during movement of the magnetic filters they act as magnetic dummies and reduce the driving force to a level lower than is otherwise needed for the left-right direction movement of the magnetic filter holding vessel 47*a*.

Figure 4:
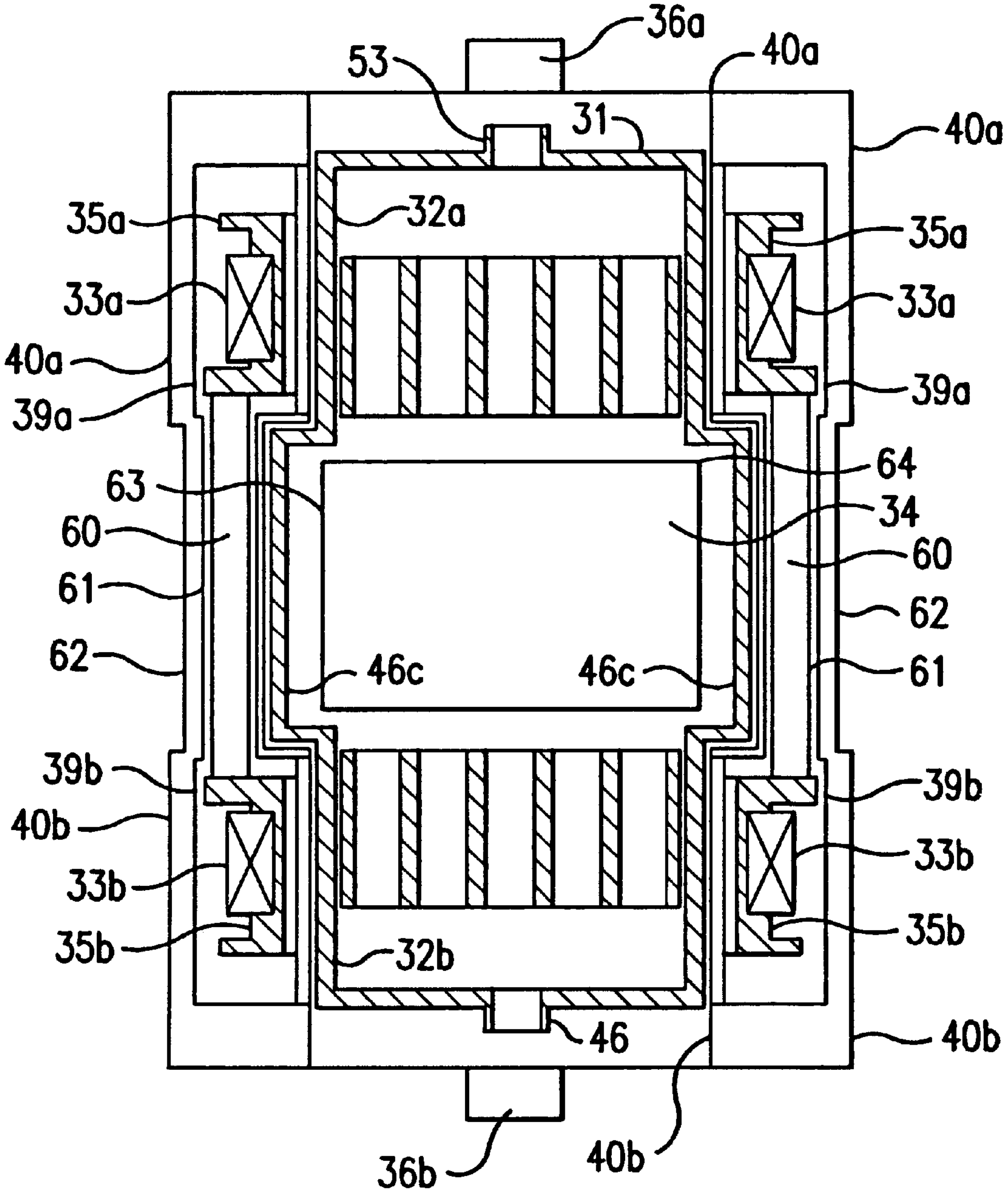
FIG. 4 is a sectional side view of the magnetic separator of the preferred embodiment shown in FIG. 1.

Because a mutual attracting force arises between the superconducting electromagnets 33*a*, 33*b* during excitation of the electromagnets 33*a*, 33*b*, a plurality of rods 60 are fitted between the bobbins 35*a*, 35*b* to prevent the two from approaching each other, as shown in FIG. 4. The rods 60 are made of stainless steel, aluminum alloy, nickel alloy or epoxy resin composite or the like, and are surrounded by the cylindrical heat shield vessel 61 and vacuum vessel 62. In FIG. 4, the magnetic separation space in the middle 34 (the space inside the magnetic filter housing 46*c*) and the space inside the magnetic filter housing 46*a* are connected by an opening 63 for movement of the magnetic filters 48*a* and 48*b* which are packed into the magnetic filter holding vessel 47*a*. Around the opening 63 there is the partition wall 64 which contacts the periphery of the partition 49*b* shown in FIG. 2 and separates the two spaces substantially watertightly.

According to this preferred embodiment, a space for a magnetic separator for catching magnetic material in source water with magnetic filters is disposed between divided magnets (between the electromagnet 33*a* and the electromagnet 33*b*), and is substantially separated at both extremities from the spaces for washing off magnetic material caught in the magnetic filters, by pushing in the filter movement direction or tightening gaps of seals. The magnetic separator has a plurality of magnetic filters which move between the respective spaces, and magnetic dummy parts which permit these filters to be moved through the magnetic field with only a small driving force. Also, the spaces are disposed at a predetermined angle, for example at a right angle, to the flow direction of the water being processed. With such an arrangement it is possible to move the magnetic filters between the spaces without obstructing the flow of the water being processed, and to purify the water continuously without backwashing water leaking into the processed water. Also, because the magnetic separation space and the magnetic filter washing spaces can be disposed in the same apparatus with a single pair of magnets, the apparatus can be made small and light.

Also, because purification can be carried out continuously, without the power supply to the magnets being cut off, the purification operation efficiency of the apparatus is high.

In the preferred embodiment described above, cold parts of the refrigerating units are thermally integrated with ends of the electromagnets, to cool them directly; but the same effects can be obtained by cooling the electromagnets by way of a cooling pipe through which a working fluid of the refrigerating unit flows. Also, the same effects can be obtained by cooling the electromagnets with a superlow-temperature or low-temperature coolant such as liquid helium, liquid nitrogen or a liquefied fluorohydrocarbon.

The water being processed may be seawater, river water, lake or marsh water, industrial waste water, garbage disposal site rainwater drainage water, sewage water or flue gas washing water including animal plankton or plant plankton, organic or inorganic matter, heavy metal substances or chemical substances. The apparatus can also be used for the purification of gases such as flue gas containing magnetic material. To make heavy metal in waste water magnetic, the waste water is acid or alkali treated, and for example iron hydroxide is added. When this is done, magnetic material is formed in the waste water containing the heavy metal and it becomes possible to apply magnetic separation.

With this preferred embodiment it is unnecessary to remove the magnetic field in order to backwash. Therefore, if a permanent current switch is provided on the superconducting electromagnets inside the vacuum insulation vessel, so that the apparatus can operate with a permanent current after being excited once at the start of operation, a power supply replenishment system is not necessary and it is possible to temporarily remove the current cables running from the room temperature part to the supercool part. In this manner, it is possible to prevent heat from entering the supercool part from the room temperature part via the current cables, further reducing the electrical power and coolant consumption of the refrigerating units which cool the superconducting electromagnets.

Also, although in the preferred embodiment described above the magnetic material was discharged in the upstream direction of the water being processed, this may alternatively be the downstream direction or a direction perpendicular to the flow direction of the water being processed. Also, although the water being processed flows into the magnetic filters in an upward direction in the preferred embodiment described above, such flow may also be downward, horizontal or diagonal, with the equipment being disposed to match the direction of flow accordingly.

Also, superconducting electromagnets which are superconductive at high temperatures (such as niobium-titanium or niobium-tin or niobium-aluminum or bismuth or thallium superconducting electromagnets) can be used in the magnetic separator according to the invention.

Because it is not necessary to decrease the magnetic field during magnetic filter washing, permanent magnets can be used to create the magnetic field in the magnetic separation space in which the magnetic filters are disposed. Because power supplies and refrigerating machines for generating the magnetic field and vacuum insulating spaces are not necessary with such an arrangement, the operating power is low and the purification operation efficiency increases.

Figure 5:
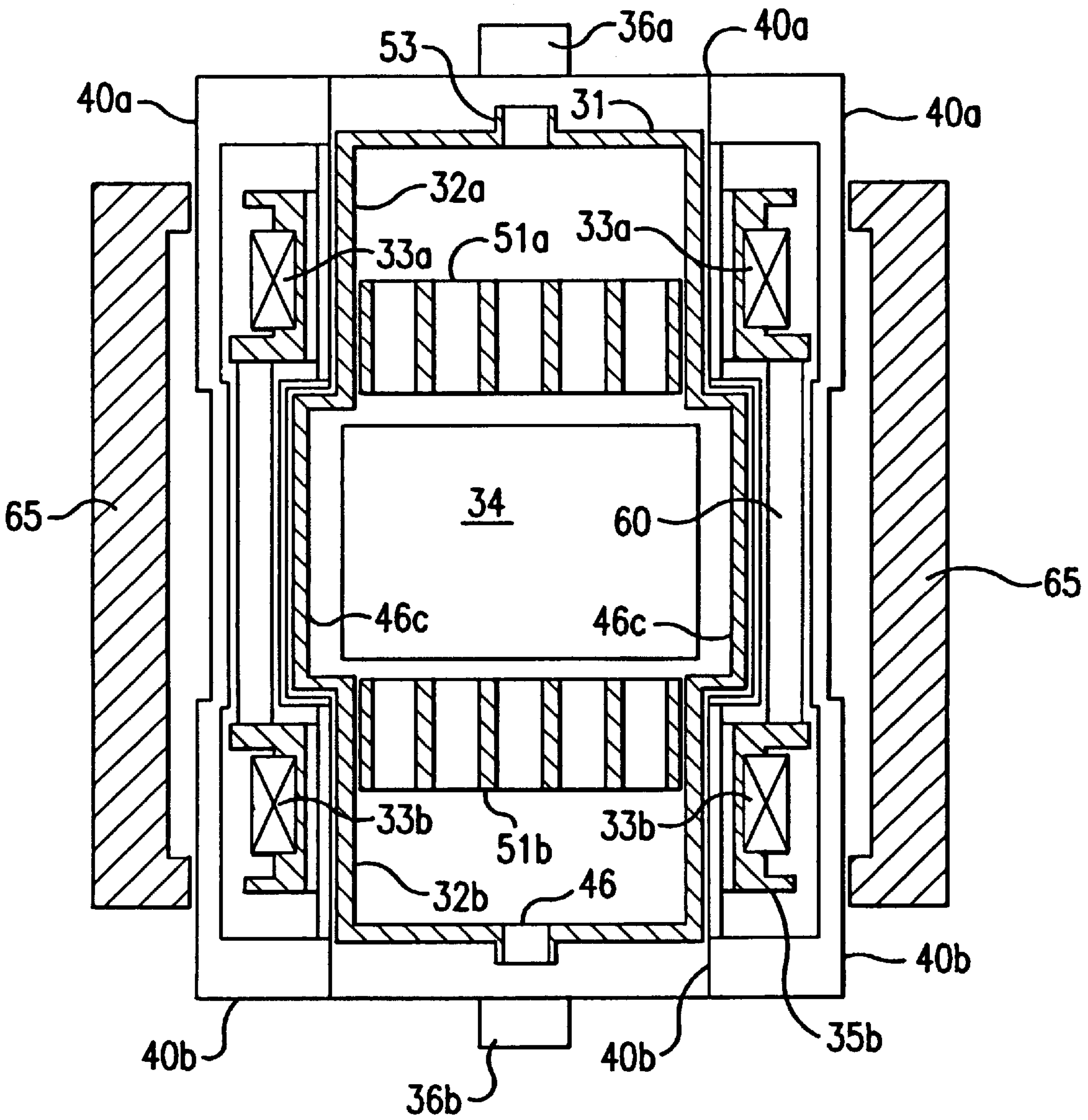
FIG. 5 is a sectional side view of a magnetic separator of a second preferred embodiment of the invention.

A second preferred embodiment of the invention is shown in FIG. 5. The difference between this embodiment and that shown in FIG. 1 is that a magnetic pole 65 is disposed substantially cylindrically around the electromagnets 33*a*, 33*b* in FIG. 1; the rest of the construction is the same as the first preferred embodiment described above, and therefore will not be described in the following.

By disposing a magnetic pole (yoke) 65 around the electromagnets 33*a*, 33*b*, that is, in the part of the magnetic field where a flux B opposite to the direction of a flux A within the cylindrical vessels 32*a*, 32*b*, and absorbing and linking the magnetic field (the flux B) around the magnets between the two electromagnets, this embodiment makes it possible to strengthen the magnetic field created in a wide magnetic separation space 34 between the magnetic poles 51*a*, 51*b* compared to when the magnetic pole 65 is not included. The magnetic catching (filtering) force in the magnetic filters is thus increased, thereby increasing the filtering efficiency. Also, by absorbing the magnetic field created by the electromagnets around the magnets with the magnetic pole 65 it is possible to reduce the leakage field, so that electronic equipment for magnetic separation control can be disposed near the magnetic separation part and the overall installation space of the apparatus can be reduced.

Figure 6:
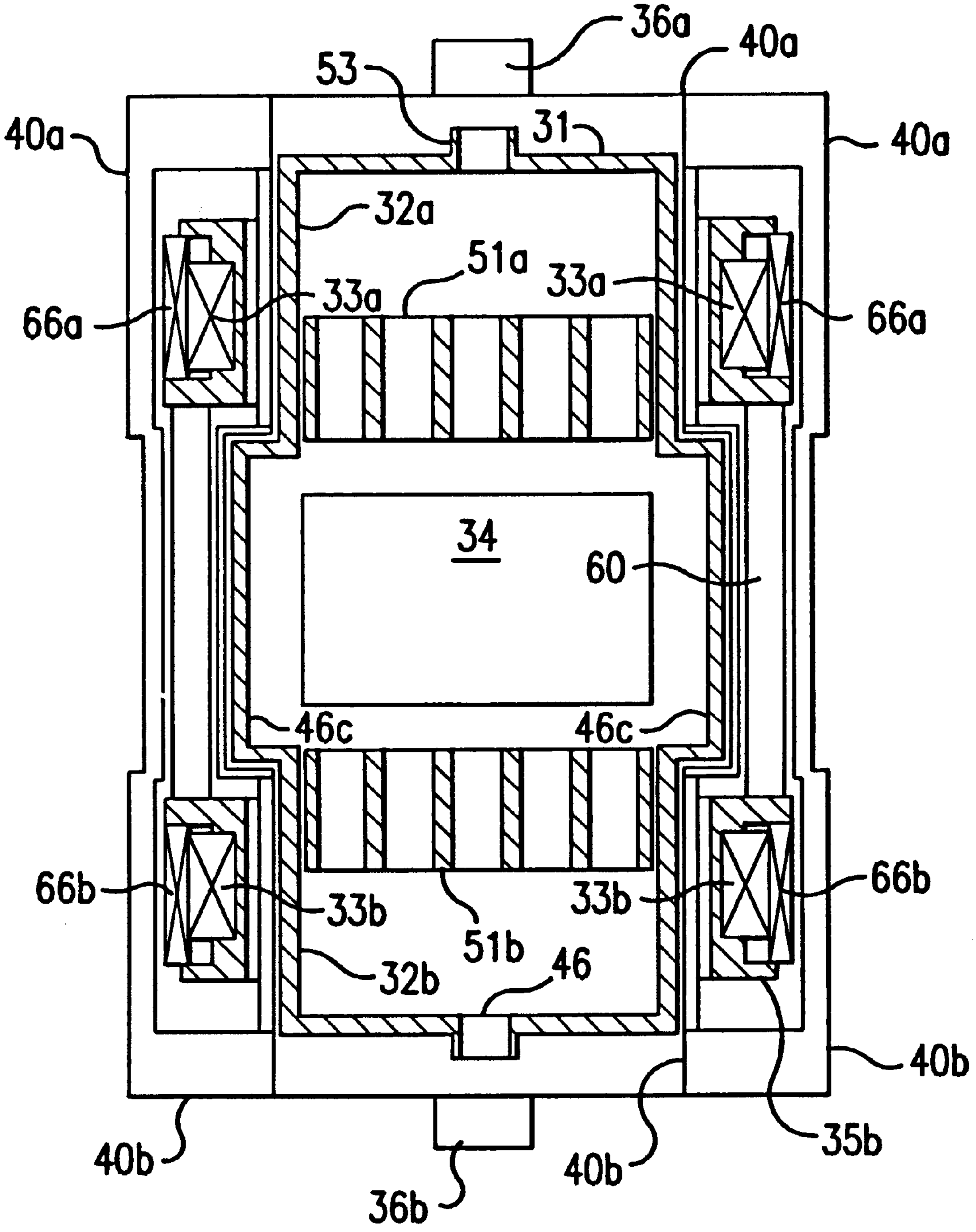
FIG. 6 is a sectional side view of a magnetic separator of a third preferred embodiment of the invention.

A third preferred embodiment of the invention is shown in FIG. 6, which differs from the embodiment of FIG. 1 in that superconducting electromagnets 66*a*, 66*b* for active shielding are disposed around the electromagnets 33*a*, 33*b* in FIG. 6. The rest of the construction is the same as the first preferred embodiment described above and therefore will not be described in the following.

By disposing the active shielding superconducting electromagnets 66*a*, 66*b* around the electromagnets 33*a*, 33*b* respectively and creating a magnetic field having a direction opposite to the magnetic field which tends to leak to around the electromagnets (so that the two magnetic fields cancel each other out, while preserving the magnetic field forming in the magnetic separation space 34 between the magnetic poles 51*a*, 51*b*) it is possible to reduce the leakage field around the electromagnets. Therefore, electronic equipment for magnetic separation control can be disposed near the magnetic separator and the overall installation space of the apparatus can be reduced. The superconducting electromagnets 66*a*, 66*b* can be made much lighter and smaller than the magnetic pole 65 of FIG. 5, so that the magnetic separation apparatus can be made lighter and smaller compared to the second preferred embodiment.

Figure 7:
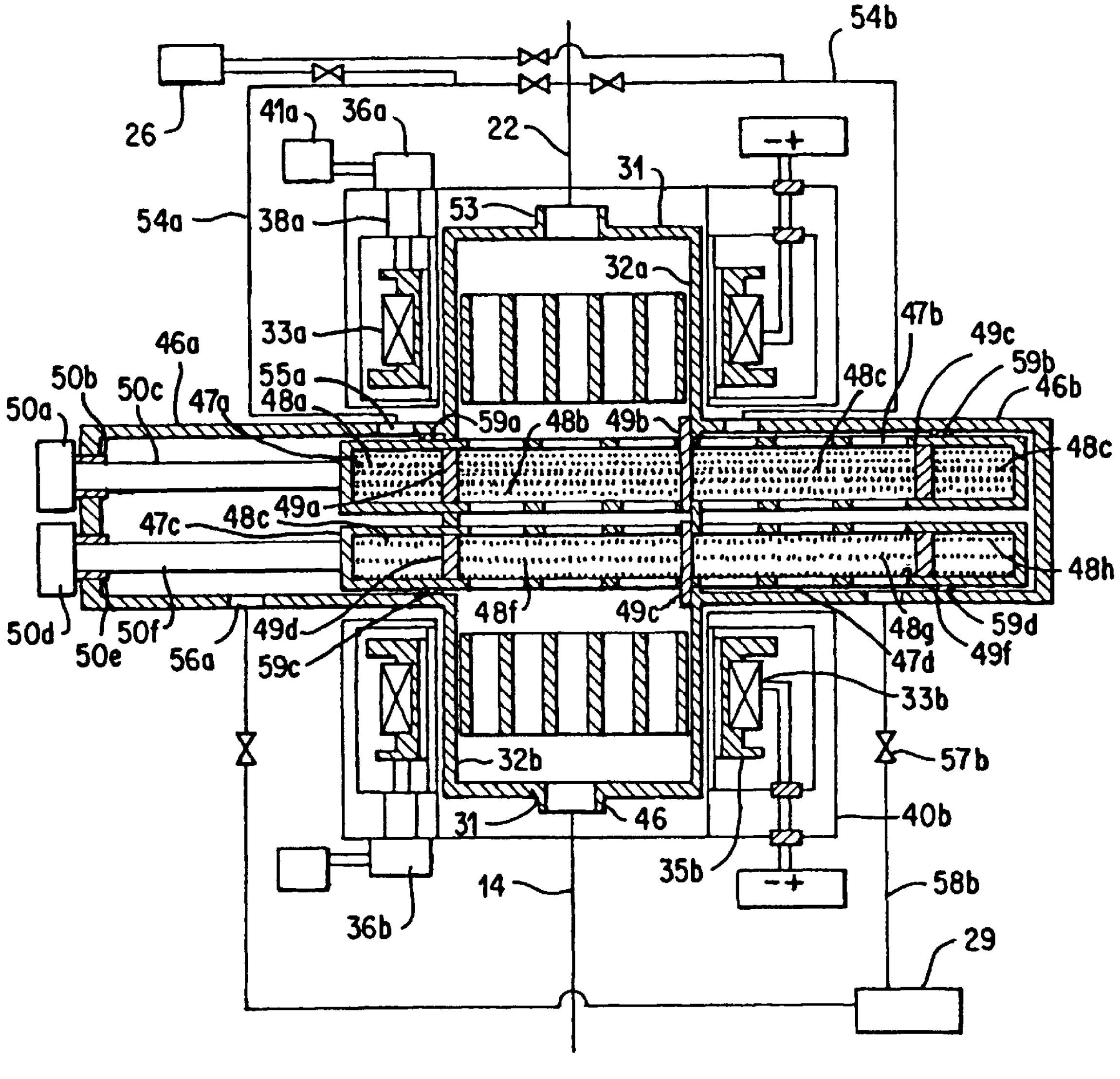
FIG. 7 is a partly sectional view of a fourth preferred embodiment of the invention.

A fourth preferred embodiment of the invention is shown in FIG. 7, which differs from the embodiment of FIG. 1 in that the magnetic filter holding vessel disposed inside the magnetic filter housings 46*a*, 46*b*, 46*c* in FIG. 1 is split into upper and lower parts 47*a*, 47*c* which are connected to rods 50*c*, 50*f* passing through airtight slide parts 50*b*, 50*e* and can be moved independently in the left-right direction in the figure by two rod driving devices 50*a*, 50*d*. The rest of the construction is the same as the first preferred embodiment described above and therefore will not be described here.

Magnetic filters 48*a*, 48*b*, 48*c*, 48*d* made of a magnetic material are disposed in the magnetic filter holding vessel 47*a* and divided by partitions 49*a*, 49*b*, 49*c*. The partition 49*b* separates the magnetic filters 48*b*, 48*c*. Also, magnetic filters 48*e*, 48*f*, 48*g*, 48*h* are disposed in the magnetic filter holding vessel 47*c* and divided by partitions 49*d*, 49*e*, 49*f*. The partition 49*e* separates the magnetic filters 48*f*, 48*g*. The backwashing tank space on the left side and the magnetic separation space are separated by seals 59*a*, 59*c*.

Holes 47*b*, 47*d*, through which a fluid being processed passes, are formed in the upper and lower faces of the parts of the magnetic filter holding vessels 47*a*, 47*c* holding the magnetic filters 48*b*, 48*c*. The magnetic fine wire of the magnetic filters 48*f*, 48*g* positioned on the upstream side in the fluid being processed can be larger and packed less densely than the magnetic fine wire of the magnetic filters 48*b*, 48*c* positioned on the downstream side.

With this preferred embodiment, relatively large magnetic material in the fluid being processed is caught by the magnetic filters 48*f*, 48*g*, and magnetic material which is relatively small (that is, whose magnetic force is small) is caught by the magnetic filters 48*b*, 48*c*. It is then possible to move separately into a washing part and restore by backwashing only the magnetic filter in which caught magnetic material has reached saturation. Therefore, with this preferred embodiment, because when backwashing it is possible to wash the filters with about half of the amount of washing water for half of the filters, the concentration of the magnetic material contained in the washing water is raised and the amount of sludge produced is reduced, thereby reducing the cost of sludge processing such as drying and incineration.

Figure 9:
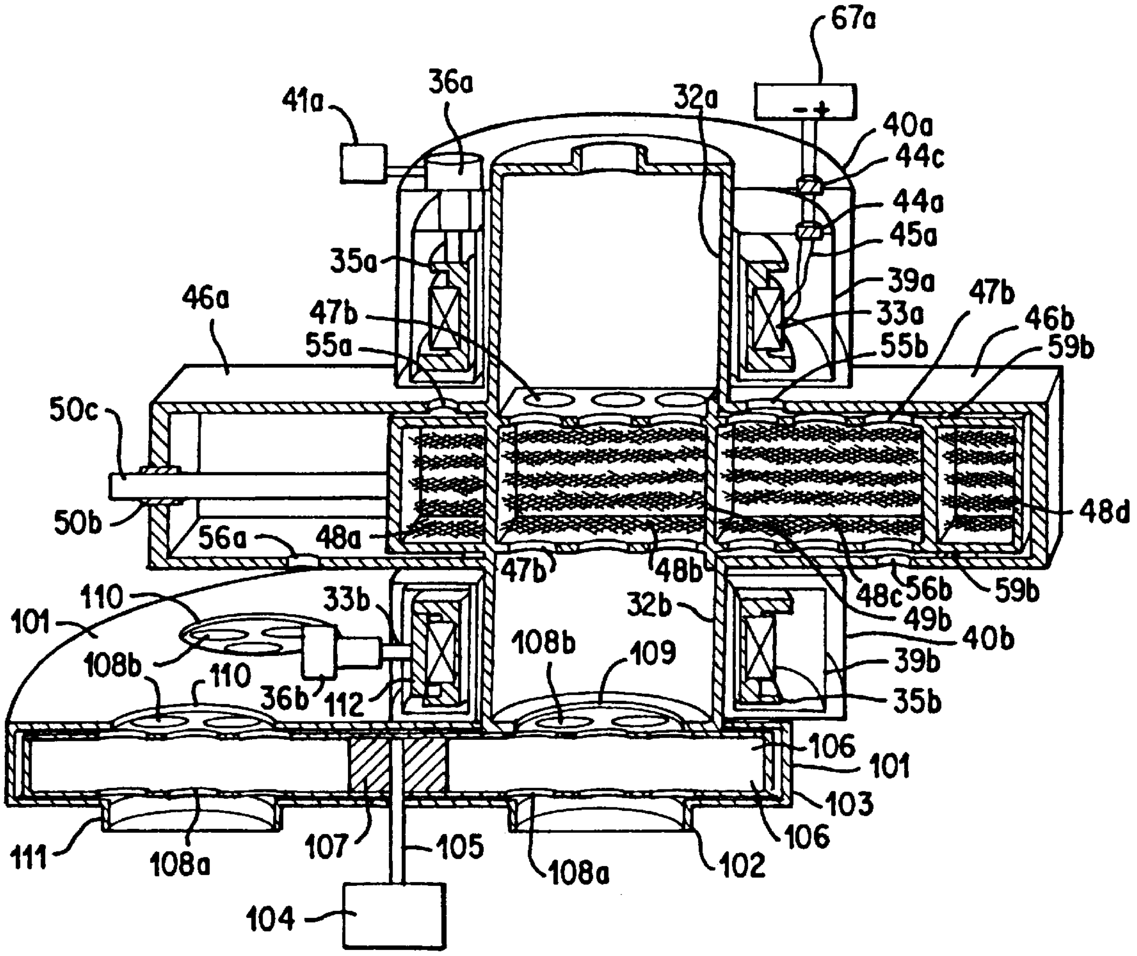
FIG. 9 is a front view of a magnetic separator apparatus of another preferred embodiment of the invention.

Another preferred embodiment of the invention is shown in FIG. 9. The principal difference between this preferred embodiment and that shown in FIG. 1 is that the magnetic poles 51*a*, 51*b* in the embodiment of FIG. 1 are omitted, and particularly leakage magnetic field leaking to the inlet side from the superconducting magnet 33*b* on the inflow water inlet side is utilized for magnetic separation. In addition, a stationary cylindrical vessel 101, which is airtightly integrated with the exterior of the cylindrical vessel 32*b* of the magnetic separator vessel 31, has an inflow opening 102 and a rotary cylindrical vessel 103 disposed therein, the latter being rotated inside the stationary cylindrical vessel 101 by means of a motor 104 and a shaft 105. The rotary cylindrical vessel 103 contains a magnetic filter 106 disposed in a single layer or multiple layers in the form of a disc and is supported by a holding member 107.

Water being processed flows through the inflow opening 102 and passes through the water passage openings 108*a*

(provided in the rotary cylindrical vessel 103), the magnetic filter 106 and water passage openings 108*b*, and flows into the cylindrical vessel 32*b* through an outflow opening 109. Because the magnetic filter 106 passes through a magnetic field (leaking from the superconducting magnet 33*b* to the inlet side in a position below the superconducting magnet 33*b*), in this position the magnetic filter 106 produces a magnetic force, so that water borne particles containing a lot of magnetic powder are attracted to the surface of the magnetic filter 106. The attracted magnetic particles caught on the rotating magnetic filters are moved to a point outside the leakage magnetic field. Where the magnetic attraction force is lost. The particles are then washed off by washing water which flows in through backwashing water inlets 110, passes through discharge openings 111 and is stored in a backwash water tank 29 in the same way as in FIG. 1. This backwashing water is then separately taken from the backwash water tank 29 and dewatered and disposed of in a landfill or the like, or magnetic powder may be recovered from it and the rest then burned or otherwise disposed of. These operations are carried out continuously, without interruption of the power supply to the superconducting magnets.

For cooling of the superconducting electromagnets 33*a*, 33*b* (not shown in FIG. 9), in the same manner as shown in FIG. 1 refrigerating units 36*a*, 36*b* are linked to compressors 41*a*, 41*b* by high-pressure pipes 42*a*, 42*b* and low-pressure pipes 43*a*, 43*b* and supplied with a working fluid at a high pressure. The fluid is allowed to expand adiabatically inside the refrigerating machines to produce cold, and the expanded working fluid is returned to the compressors. Also not shown in FIG. 9, current is supplied to the magnets from power supplies 67*a*, 67*b* as in FIG. 1. Also, the superconducting magnet 33*b* is cooled by way of a heat conductor 112. The shape and size of the mesh of the magnetic filter 106 need not be the same as those of the magnetic filters 48*b*, 48*c*.

In this preferred embodiment, magnetic material in the water being processed on which magnetism acts relatively strongly are continuously caught by the magnetic filter 106, and magnetic material which is relatively small (that is, whose magnetic force is small) which is not caught by the magnetic filter 106 is caught with the magnetic filters 48*b*, 48*c*. Therefore, in this preferred embodiment, the amount of magnetic material caught in the magnetic filters 48*b*, 48*c* is reduced, which permits a reduction of the number of magnetic filter layers. The required spacing between the superconducting magnets can be made small, and as a result, the magnets and the apparatus can be made compact.

Thus, the invention permits a plurality of magnetic filters to be used alternately for magnetic separation operation with one set of electromagnets, without obstructing the flow of the fluid being processed. It is therefore possible to purify a fluid by magnetically separating magnetic material in the fluid from the fluid continuously.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A fluid purifying apparatus comprising:

a magnetic separator which magnetically removes magnetic material from a flowing fluid, said magnetic separator having a flow passage for said fluid;

magnetic field generator which forms a magnetic field in the flow passage;

a magnetic filter matrix, which is made of a magnetic material and retractably disposed in the flow passage;

driving means for withdrawing at least a part of the magnetic filter matrix in a withdrawal direction, from inside the flow passage to outside the flow passage, and for reinserting said at least a part of the magnetic filter matrix into the flow passage from outside the flow passage; and a housing which is separated from the atmosphere, for receiving the magnetic filter matrix withdrawn to outside the flow passage, the housing being provided with regenerating means for washing the magnetic filter matrix inside the housing;

wherein the magnetic filter matrix is divided, in a direction of flow of the fluid into a plurality of separately movable divided magnetic filter matrices, and there are provided driving means for driving each of the divided magnetic filter matrixes independently.

2. A purifying apparatus according to claim 1, wherein the magnetic filter matrix is divided by fluid partitions into a plurality of magnetic filter matrix parts, and the magnetic filter matrix which is received in the housing is separated by one of the fluid partitions which provides a substantially fluid tight seal.

3. A purifying apparatus according to claim 2, wherein while at least one magnetic filter matrix part is regenerated by washing in the housing, fluid being processed is separated and purified in the flow passage of the magnetic separator by another magnetic filter matrix part of the magnetic filter.

4. A purifying apparatus according to claim 1, wherein ends of the magnetic filter matrix extend outside the magnetic field in the flow passage in all positions of said filter matrix.

5. A purifying apparatus according to claim 1, wherein:

the magnetic field generator is divided into an upstream element disposed on an upstream side and a downstream element disposed on a downstream side of the magnetic filter relative to a direction of flow of the fluid being processed;

the magnetic filter matrix moves within an area between the upstream element and the downstream element; and directions of magnetic fluxes formed by the upstream element and the downstream element are the same.

6. A purifying apparatus according to claim 1 wherein the magnetic field comprises an air-core magnet.

7. A purifying apparatus according to claim 1 wherein the magnetic field generation comprises a superconducting electromagnet cooled by a refrigerating unit.

8. A purifying apparatus according to claim 1 wherein the magnetic field generator comprises a superconducting electromagnet connected to a permanent current switch.

9. A purifying apparatus according to claim 1 further comprising a magnetic yoke for absorbing a magnetic flux of an opposite direction to a direction of a magnetic flux of the magnetic separator.

10. A purifying apparatus according to claim 1 further comprising:

means for adding to the fluid being processed at least one of: a magnetic substance, a coagulant, and an additive producing a magnetic material by chemically acting with a material to be removed.

11. A purifying apparatus according to claim 1 further comprising:

means for adding to the fluid being processed at least one of: a magnetic substance, a coagulant, and an additive producing a magnetic material by chemically reacting with a material to be removed; and means for stirring the fluid being processed with the material so added.

12. Apparatus for removing magnetic material from a fluid comprising:

a fluid flow path;

a magnetic field generator comprising first and second elements arranged upstream and downstream of a filter area in said fluid flow path for generating a magnetic field in said filter area of said fluid flow path;

a first magnetic filter element arranged transversely to said fluid flow path in said filter area, between said first and second elements of said magnetic field generator, said first magnetic filter element comprising at least first and second filter sections which are movable alternatively between a filtering position within said fluid flow path and a backwash position outside said fluid flow path; and a second magnetic filter element arranged in said fluid flow path, upstream from said filter area and upstream of said first and second elements of said magnetic field generator, said second magnetic filter element being linked by a magnetic field which leaks from said magnetic field generator.

13. Apparatus according to claim 12 wherein said second magnetic filter element extends laterally beyond said fluid flow path to a backwash area and is continuously movable whereby at least a section of said second magnetic filter element is being backwashed while at least another section thereof is arranged in said fluid flow path.

* * * * *